June 3, 1930. O. W. FRY 1,761,334
TRUCK FRAME EXTENSION
Filed May 5, 1928 2 Sheets-Sheet 1
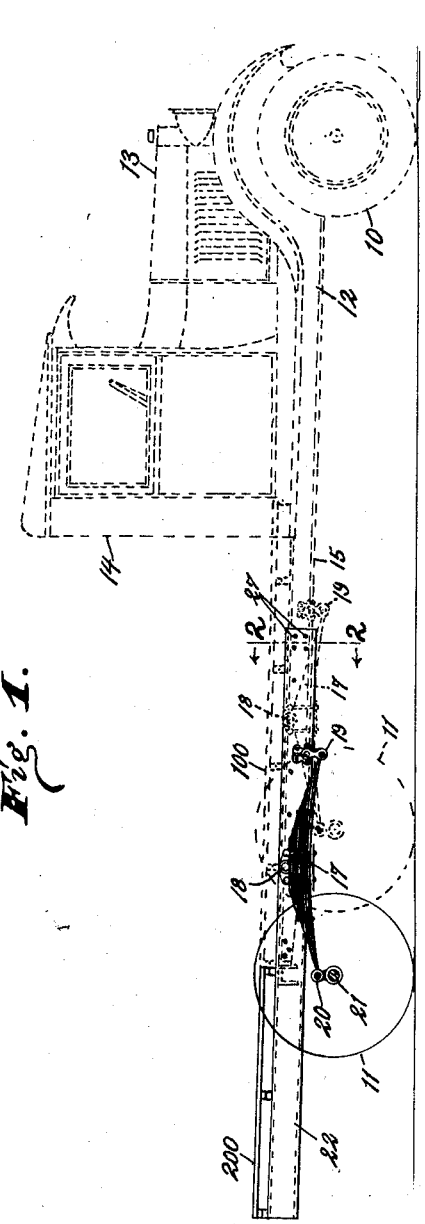
Inventor
Orlander W. Fry
by
Lockwood & Lockwood,
His Attorneys.

June 3, 1930.  O. W. FRY  1,761,334
TRUCK FRAME EXTENSION
Filed May 5, 1928   2 Sheets-Sheet 2

Inventor.
Orlander W. Fry.
by
Lockwood & Lockwood,
His Attorneys.

Patented June 3, 1930

1,761,334

UNITED STATES PATENT OFFICE

ORLANDER W. FRY, OF LOS ANGELES, CALIFORNIA, ASSIGNOR TO O. R. FULLER CO., OF LOS ANGELES, CALIFORNIA, A CORPORATION

TRUCK-FRAME EXTENSION

Application filed May 5, 1928. Serial No. 275,428.

This invention is an auxiliary frame for rear end attachment to a motor vehicle frame or truck frame, for the purpose of increasing the carrying capacity thereof.

The object of the invention is to make such auxiliary frame or truck extension so that it can be easily, quickly and securely united to motor vehicle frames, and particularly with those having tapering frames, without any preliminary measurements or special construction for every individual attachment. The auxiliary frame or attachment is made so as to substantially fit the tapering frame of the motor vehicle. This object is attained by pivoting a cross bar to the two side bars of the auxiliary frame and between their ends so that the forward ends of the side bars of the auxiliary frame can be moved horizontally toward or away from each other. The cross bar to which the side bars of the auxiliary frame are pivoted is preferably made of the same length as the cross bar at the rear end of the main vehicle frame so that the width of the auxiliary frame at said cross bar is substantially the same as the width of the rear end of the main frame of the vehicle. Because the side bars of the auxiliary frame are horizontally oscillatable on the cross bar to which they are pivoted, said auxiliary frame is adapted to be moved longitudinally and forwardly on the main frame until the cross bar of the auxiliary frame abuts against the cross bar at the end of the main frame. Then the front end of the side bars of the auxiliary frame are moved laterally toward each other and against the side bars of the main frame, and means are provided for securing them to said side bars of the main frame, so that the auxiliary frame practically embraces the main frame, and this is particularly true where said frames are made of channel iron and the side bars of the auxiliary frame embrace the side bars of the main frame. This makes a very strong and tight mounting of the auxiliary frame and said auxiliary frame can be made of standard size and readily slipped on and secured to the rear end of the main standard truck frames.

The accompanying drawings illustrate the invention.

Figure 4:
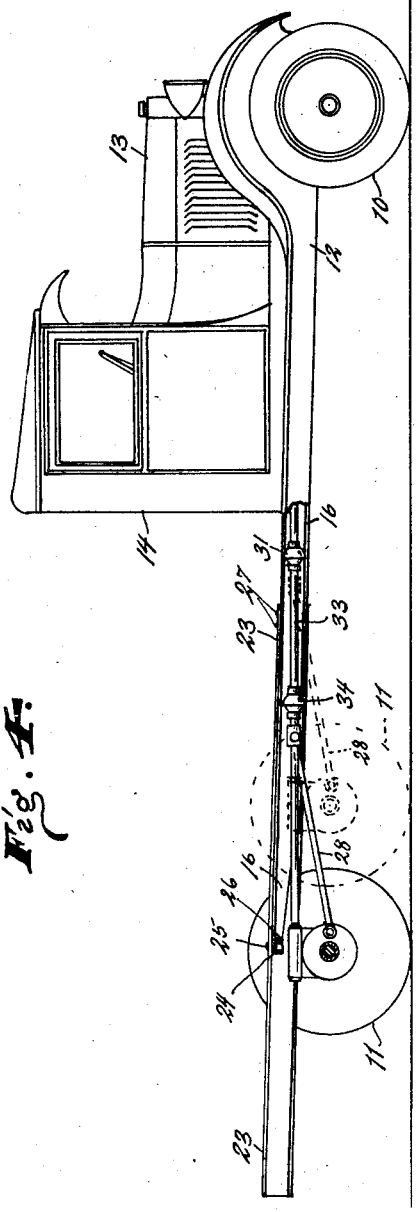
Figure 5:
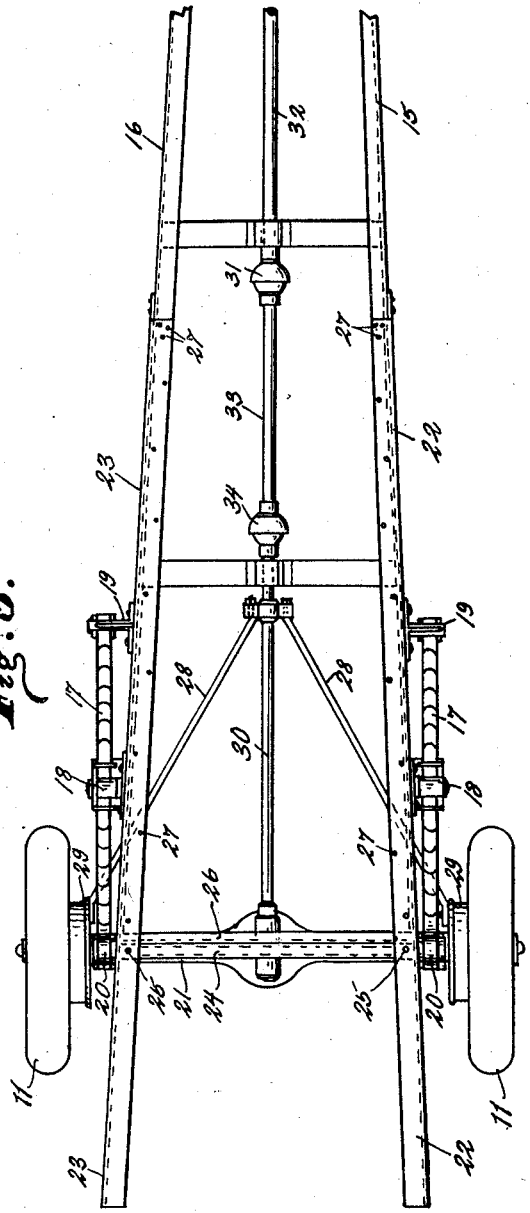

Fig. 1 is a side view of an extension or auxiliary frame constructed in accordance with this invention showing it attached to the rear end of a truck diagrammatically indicated by dotted lines. Fig. 2 is an enlarged cross section on line 2—2, Fig. 1, showing a channel iron of the auxiliary frame embracing and secured to a side rail of the main frame. Fig. 3 is a plan view of the auxiliary frame adapted to be placed on and secured to the main frame which is indicated by the inner dotted lines; also showing by dotted lines the position of the auxiliary frame after it has been longitudinally moved over the wide rear end of the main frame before the front end portions of the channel irons of the attachment are moved inwardly to embrace and be secured to the main frame. Fig. 4 is a side elevation analogous to Fig. 1 with parts of the frame broken away and the platform and springs omitted to more clearly show the auxiliary frame and also the position of the rear wheels when moved back from the dotted to the full line position. Fig. 5 is a plan view of the rear end of the truck with the auxiliary frame attached thereto, the platforms being omitted for the sake of clearness in showing the connection of the drive wheels to the engine shaft.

A vehicle of the truck type is shown in the drawings with the frame extension connected thereto. The truck includes front and rear wheels 10, 11 carrying a tapering frame 12 on which an engine 13 is mounted in front of a driver's cab 14, the rear drive wheels 11 being connected to the side rails 15, 16 by springs 17, cantilevers 18 and hangers 19 and the usual truck platform 100 indicated by dotted lines. These parts are all old and well understood in the art and are therefore not shown or described in detail, it being understood that there is a pivotal connection between the rear ends of the springs 17 and links 20 which also are arranged to rock on the rear axle housing 21.

The auxiliary frame or extension includes a pair of side channel irons 22, 23 which are pivotally connected by an intermediate cross bar 24 that can also be a channel iron. This cross bar has its ends pivotally connected to the channel irons by rivets 25 so that their forward end portions can be first moved forward over the wide rear end of the frame 12 and then moved inwardly toward each other to embrace the side bars 15, 16 to which they are secured as by bolts or rivets. However before the auxiliary frame or extension is so attached the springs 17 with their supports are first disconnected from the main frame which is then supported in the usual way, as by lifting jacks or trestles. Then the auxiliary frame is moved forward over the wide rear end 26 of the main frame, as stated, which, as is well known, has its side bars 15, 16 tapering inwardly as they extend from the rear to the front end of the frame.

After the auxiliary frame has been moved to a position in which the cross bar or channel iron 24 abuts against the end bar 26 of the main frame, as shown by dotted lines in Fig. 3, the channel irons of the auxiliary frame 22, 23 are then moved inward scissors-like on their pivotal rivets 25 from their dotted to full line position in which the forward end portions embrace the side rails 15, 16 and are then secured thereto by bolts or rivets 27.

This arrangement of the auxiliary frame spreads the rear end portions of the channel irons 22, 23 of the auxiliary frame and also leaves them extended a considerable distance beyond the rear end of the main frame in position to support the auxiliary platform 200 which is a continuation of the truck platform 100, thereby greatly increasing the carrying capacity of the truck.

After the frames are so connected the drive wheels which have been disconnected from the universal joint interposed between it and the engine is then moved rearwardly to a position in which the increased load will be properly distributed relative to the new wheel base. Then the cantilevers 18 and spring hangers 19 are again secured to the reinforced frame so that the rear wheels 11 again support the rear end of the frame and their proper proportion of the load.

This rearrangement of the drive wheels carries back the usual radius rods 28 supported on the brake hubs 29 and also the drive shaft 30 which, as previously stated, is disconnected from the universal joint 31 on the engine shaft 32. Consequently an intermediate link shaft 33 and universal joint 34 are interposed between the shaft 30 and universal joint 31 to compensate for the change of position of the drive wheels.

By means of the truck extension hereinbefore described the carrying capacity of an ordinary truck is greatly increased at low cost and a minimized amount of labor.

The method of extending the truck frame is substantially as hereinbefore described.

I claim as my invention:

In combination with a motor vehicle frame having side bars and a rear cross bar; an auxiliary frame comprising a pair of side bars adapted to snugly engage with said motor vehicle frame side bars, a cross bar pivotally connected at its ends to said auxiliary side bars inwardly from the rear end of the latter, said cross bar being of a length equal to the width of the rear end of said motor vehicle frame and adapted to abut with the latter, and means for securing said auxiliary side bars near their forward ends to said frame side bars.

In witness whereof, I have hereunto affixed my signature.

ORLANDER W. FRY.